Jan. 10, 1950     O. GIERWIATOWSKI     2,494,235
STOP-ON-SIGNAL RADIO APPARATUS
Filed Nov. 1, 1946                                4 Sheets-Sheet 1
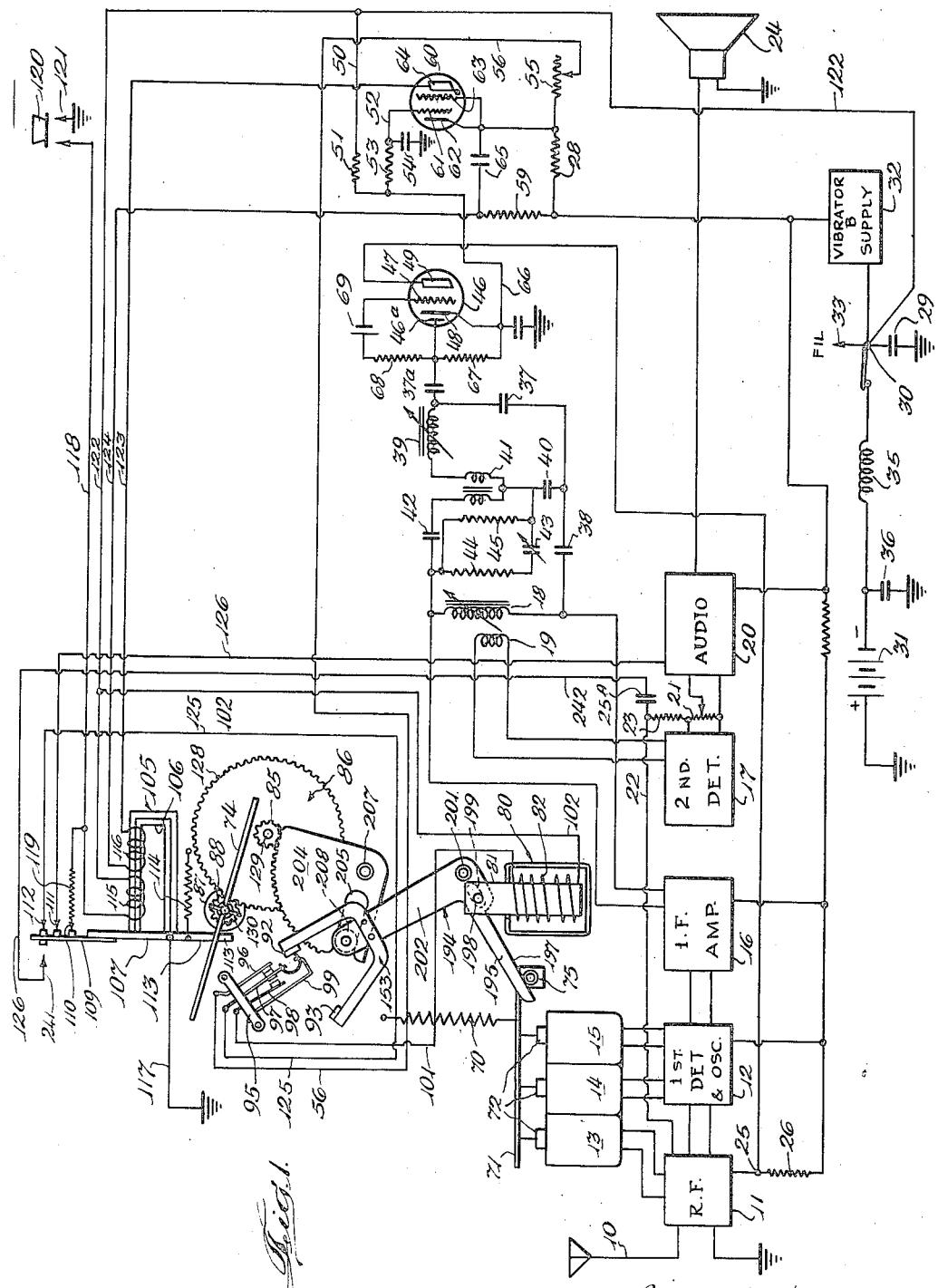
Inventor:
Olgierd Gierwiatowski
By Hinkle, Horton, Ahlberg, Hausmann & Wupper
Attorneys

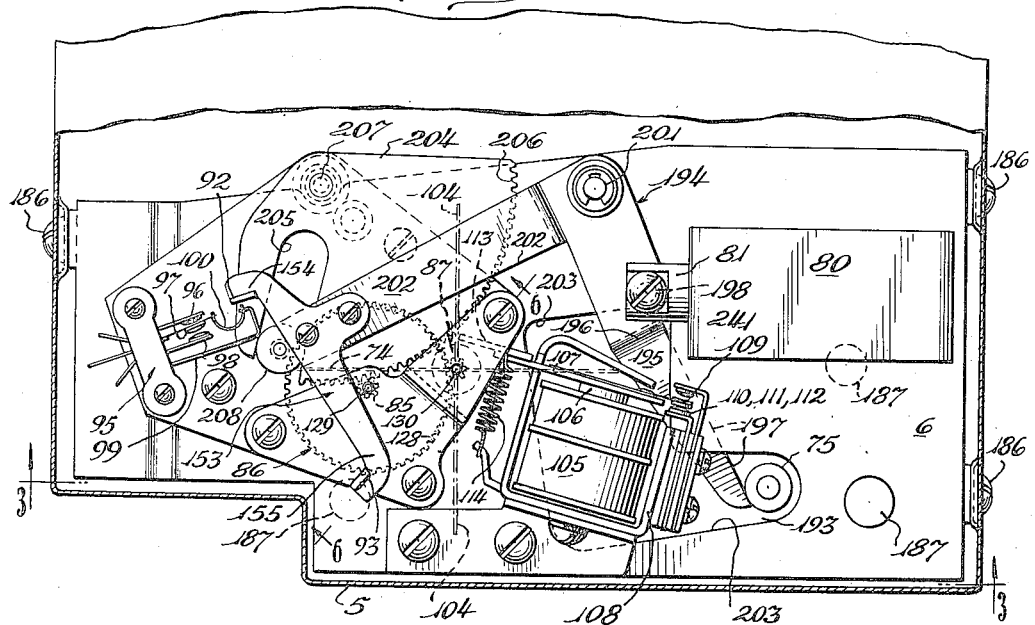

Jan. 10, 1950   O. GIERWIATOWSKI   2,494,235
STOP-ON-SIGNAL RADIO APPARATUS

Filed Nov. 1, 1946   4 Sheets-Sheet 3

Inventor:
Olgierd Gierwiatowski
By Hinkle, Horton, Ahlberg, Hausmann & Kupper
Attorneys Jan. 10, 1950     O. GIERWIATOWSKI     2,494,235
STOP-ON-SIGNAL RADIO APPARATUS
Filed Nov. 1, 1946     4 Sheets-Sheet 4
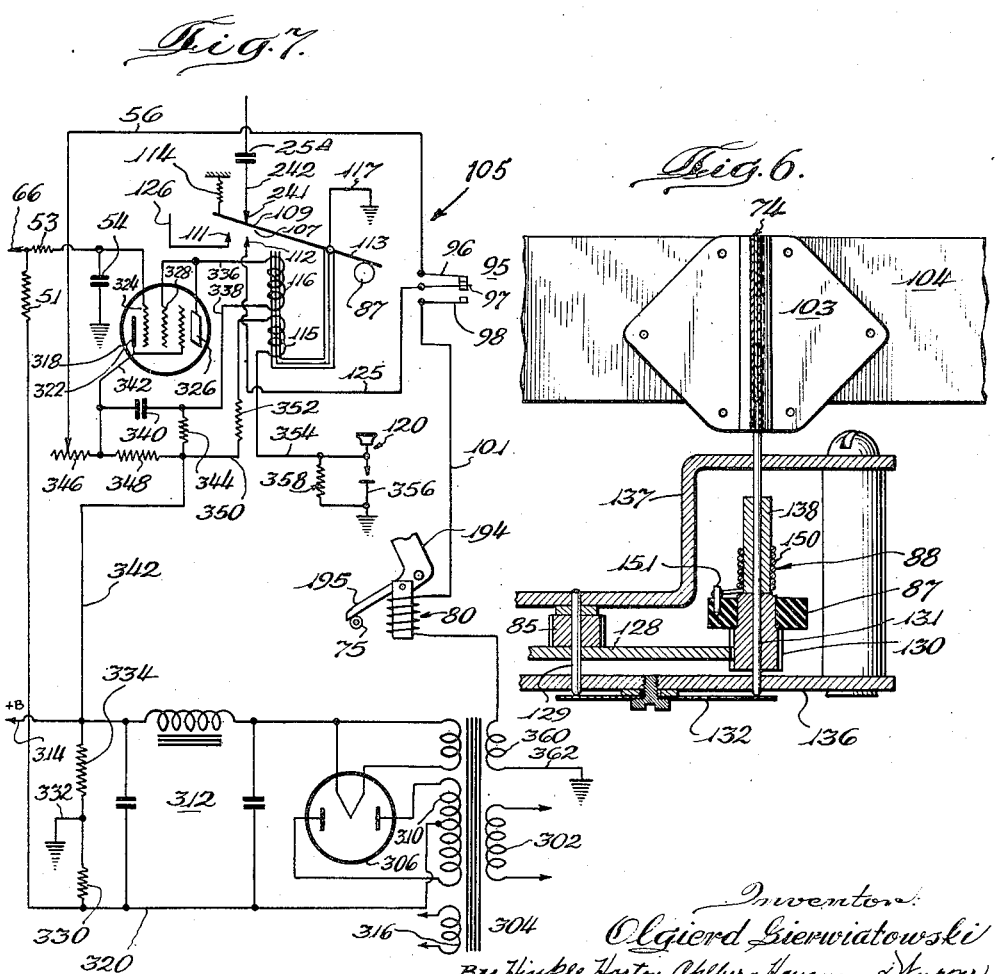
Inventor:
Olgierd Gierwiatowski
By Hinkle, Horton, Ahlberg, Hausmann & Kupper
Attorneys Patented Jan. 10, 1950

2,494,235

UNITED STATES PATENT OFFICE 2,494,235

STOP-ON-SIGNAL RADIO APPARATUS

Olgierd Gierwiatowski, Oak Park, Ill., assignor to Edward F. Andrews, Chicago, Ill.

Application November 1, 1946, Serial No. 707,132

19 Claims. (Cl. 250—40)

1

This invention relates to radio apparatus of the self-tuning type. More particularly, it relates to "stop-on-signal" apparatus, especially receivers, requiring no manual presetting to tune in progressively the signals or stations coming within their range of sensitivity. Such receivers, although having broad utility, are particularly advantageous for use as automobile receivers because the frequent changes in geographical position of the vehicle cause different stations to be within range for reception at different times. This feature of stop-on-signal receivers makes them also especially applicable to all types of automotive vehicles, including watercraft and aircraft.

Receivers of this type have been known in the art also as "stop-on-carrier" or "signal-seeking" receivers. Although "stop-on-carrier" is substantially the same in meaning as "stop-on-signal," I now prefer the use of the term "stop-on-signal" receiver for this class of device. Receivers of this general type have been described and claimed in previous patents and patent applications, such as those of Edward J. Andrews, Patent No. 2,326,738, issued August 17, 1943, and Patent No. 2,262,218, issued November 11, 1941; also in the pending applications of William J. O'Brien, Serial No. 605,397, filed July 16, 1945, and Serial No. 387,908, filed April 10, 1941 now Patent No. 2,442,430.

Certain features of the apparatus disclosed in this application are disclosed and claimed in the foregoing applications and also in the contemporaneously filed applications of Edward F. Andrews, Serial Nos. 707,219 and 707,220.

Although the invention to be described is especially adapted for use with stop-on-signal receivers for broadcast reception, its use is not necessarily restricted to this field, for stop-on-signal apparatus may also find application in radio transmitters, in the field of electronic control, and in other resonance responsive electronic apparatus.

One of the objects of the present invention, therefore, is to provide a new and improved stop-on-carrier, signal-seeking, or stop-on-signal radio apparatus.

Another object of the present invention is to provide an improved stop-on-signal radio receiver.

A further object of the present invention is the provision of a new and improved stop-on-signal radio apparatus of the type including power storage means for varying the tuning means

2 and movement restraining means for controlling the speed of variation of the tuning means characterized in that variable mechanical advantage driving means are interposed between said power storage means and said movement restraining means.

Another object of the present invention is to provide a new and improved stop-on-signal radio apparatus wherein the tuning speed is varied to compensate for the band spread variation of the tuning means and especially the band spread variation of permeability type variable tuning means.

A further object of the present invention is to provide a new and improved stop-on-signal means in which the band spread variation of the tuning means is compensated by a plurality of means, notably power storage means operating the tuning means which is most effective when the greatest speed of the tuning means is desired, variable gear ratio and torque transmission means, and tuning means movement restraining means of a character whose speed depends upon the torque applied to it.

A further object of the present invention is to provide a new and improved stop-on-signal radio apparatus of the type wherein the tuning means is varied by power storage means including means for charging the power storage means and means for preventing the charging means from being operated while the tuning means is stopped, and more particularly an apparatus of the character wherein the tuning means is stopped by a brake. According to this feature of the invention, the charging means, which is preferably a solenoid or other electromagnetic means, cannot be operated or energized while the brake is on.

A further object of the present invention is to provide a new and improved stop-on-signal radio apparatus including maintained contact switch means associated with variable tuning means adapted selectively to render operative either the stop-on-signal means or the means for charging power storage means which varies the tuning means.

Another object of the present invention is to provide a new and improved stop-on-signal radio apparatus including power storage means for varying tuning means and electromagnetic means for charging said power storage means wherein the stop-on-signal means prevents operation of said electromagnetic means when the tuning means is stopped.

Still another object of the present invention is to provide a new and improved stop-on-signal radio apparatus of the type in which power storage means is utilized to vary the tuning means including means for rendering the stop-on-signal means inoperative while the power storage means is being charged.

A further object of the present invention is to provide a new and improved stop-on-signal means including variable tuning means and means including transmission means and movement restraining means for controlling the speed of the tuning means, characterized further in that the tuning means is varied by power storage means, particularly a spring, connected to the tuning means whereby it takes out all the play in the transmission means.

This is of particular importance in that all of the play is taken out of the drive between the tuning means and the restraining means and the arrangement is even more important when the tuning means is stopped by braking means effective at the high speed end of the transmission means. In this case all the play is also taken out between the tuning means and the brake.

A further object of the present invention is to provide a new and improved stop-on-signal apparatus characterized by a novel and simple means for preventing premature termination of the variation of the tuning means, a feature which is especially desirable to prevent stoppage of the tuning means twice in succession to a particular signal or station.

Another object of the present invention is to provide a new and improved stop-on-signal radio apparatus of the type including power storage means for varying the tuning means and electromagnetic means for charging the power storage means having switch means alternately to connect the charging means to an alternating current circuit and the stop-on-signal means to a direct current circuit.

A further object of the present invention is to provide a new and improved apparatus of the character set forth in the preceding paragraph wherein the direct current circuit is energized from one secondary winding of a transformer and the alternating current circuit is energized from a secondary winding of the same transformer.

Another object of the present invention is to provide a new and improved stop-on-signal radio apparatus of the type comprising resilient power storage means for varying the tuning means and electromagnetic means for charging said power storage means, characterized in that the charging and stopping means are controlled by a single pole double throw switch, the movable pole of which is included in alternating and direct current circuits associated with the charging means and stop-on-signal means, respectively, and also to a switch controlled by the stop-on-signal means.

A further object of the present invention is to provide new and improved mechanical arrangements interconnecting the tuning means, the power storage means which varies the tuning means, and the restraining means controlling the speed of the tuning means.

Further objects, advantages, and capabilities of the invention will become apparent upon study of the following specifications and accompanying drawings, in which:

Fig. 1 is a schematic illustration of a preferred embodiment of the invention as applied to automobile receivers;

Fig. 2 is a detailed top plan view of a preferred embodiment of certain of the apparatus shown in Fig. 1;

Fig. 3 is a detailed side elevational view of the apparatus shown in Fig. 2 as seen along the lines 3—3;

Fig. 6 is an enlarged sectional view of the ratchet mechanism as viewed along the line 6—6 of Fig. 2; and Fig. 7 is a fragmentary diagrammatic view, illustrating a further embodiment of the invention.

Figure 4:
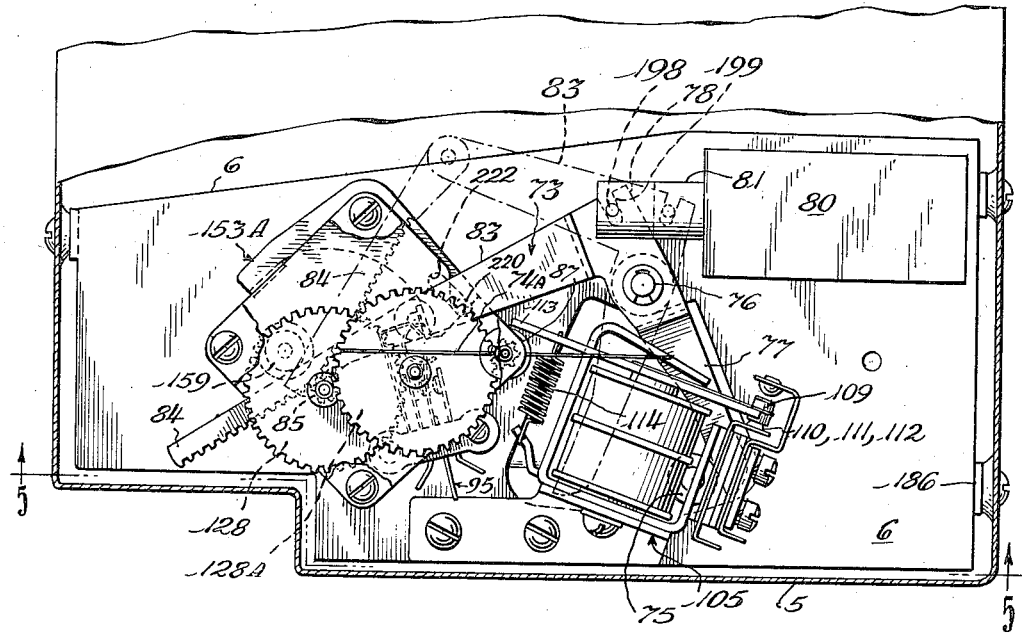
Fig. 4 is a detailed plan view of another embodiment of the invention, including a phantom view of some of the movable parts thereof in a changed position.

Referring now to the drawings, and more particularly to Fig. 1, it illustrates a preferred embodiment of the invention applied to an automobile radio receiver. More particularly, it represents an automobile radio receiver of the superheterodyne type, including an antenna 10; a tuned radio frequency amplifier 11 and its associated variable tuning means 13; a first detector and oscillator 12 and the variable tuning means 14 and 15 associated therewith; an intermediate frequency amplifier 16 which may have a plurality of stages; a second detector 17; a transformer having a primary 18 and a secondary 19 coupling the intermediate frequency amplifier 16 to the second detector 17; an audio frequency amplifier 20; a volume control voltage divider 21; an automatic volume control circuit 22; and a loudspeaker 24.

Power is preferably supplied to the apparatus by the vehicle storage battery 31 which serves directly as a source of filament supply for the tubes, as well as to energize a relay and solenoid forming part of the stop-on-signal means to be described hereinafter. The power supply includes a high voltage "B" supply 32, which may be a standard vibrator unit of the type commonly used in vehicular radios. The filament supply, indicated at 33 and which is connected to the filaments (not shown) of all the tubes, and current to the "B" supply are controlled by an "on-and-off" switch 30, which may be physically connected to the volume control 21. A choke coil 35 connected to the ungrounded negative terminal of the battery serves to isolate high frequency currents from the battery circuit, and capacitors 29 and 36 serve to ground high frequency currents.

The variable tuning means 13, 14 and 15 are preferably of the variable permeability type having powdered iron movable internal cores 72. These are arranged for sliding movement by means of the spring 70 (constituting a power storage means of a preferred resilient type, although it should be understood that power storage means of other types, such as gravity, could be used) which pulls a yoke 71 to which the several cores are attached outward from the low frequency end of the core travel within the coils to the high frequency end of travel whereat the cores are out of the coils.

Before proceeding further with the detailed description of the electrical circuits and aspects of the apparatus, consideration will be had of the mechanical construction of the main components of the stop-on-signal means and especially of a transmission including a variable mechanical advantage driving means interconnecting the spring 70 and cores 72 with an associated speed restraining means 74.

Reference will now be had to Figs. 2 and 3, which illustrate in detail the mechanism shown schematically in Fig. 1. The metal cabinet of the receiver is indicated by reference character 5. Within it is supported a tuning mechanism chassis 6 suitably attached to the cabinet 5 by means of screw fastenings 186.

The tuning means 13, 14 and 15 are mounted upon a stationary frame 7 supported a short distance beneath the chassis 6 by means of the spacers 187. The yoke 71, to which cores 72 are attached, is secured for sliding movement upon a pair of spaced apart guide rods 188 supported at their two ends by two upturned lugs 189 and 191 formed at the ends of the frame 7. One end of the yoke and core actuating spring 70 is attached to a pin 192 projecting from the frame 7 near lug 189 and the other end of the spring is tensioned and hooked to a bracket 193 secured to the yoke.

A roller 75 mounted at the end of bracket 193 is maintained in camming relationship with the camming surface 197 of an arm 195 of pivoted lever 194 by the pull of spring 70 upon yoke 71. The lever 194 is pivotally mounted upon chassis 6 by means of a stud 201. The arm 195 is provided with an offset portion 196 which passes down through an irregularly shaped aperture 203 in the chassis 6 so that the camming surface 197 is at the level of and may contact roller 75. When the roller 75 is pulled against camming surface 197 by spring 70, it tends to turn the pivoted lever 194 in clockwise direction, as viewed in Fig. 2. If desired, the camming surface 197 may be curved to compensate for the component of angular displacement of pivoted lever 194. It may also be curved to compensate for the variation of pull with length of stroke of the solenoid plunger 81 and of the spring 70.

The spring 70 is charged and the cores are moved from their high to their low frequency positions by charging means, preferably an electromagnetic solenoid 80 which is mounted upon the upper side of the chassis 6 in a position enabling its plunger 81 to retract the arm 195 of pivoted lever 194. The end of the plunger is fitted with a pin 198 which engages the surface of a small slot 199 in arm 195 located between the offset portion 196 and stud 201. In order to prevent short circuiting of the flux produced by the solenoid, the arm 194 should be made of some non-magnetic material such as brass, or it should be magnetically insulated from the solenoid plunger 81.

The energization of the solenoid 80 is controlled in a manner to be described in detail hereinafter. For the present it will suffice to state that it is supplied with power from the battery through conductors 102 and 122, the circuit being completed through ground and, more particularly, through conductor 101, a position limit switch 95 when the latter is in a position into which it is operated when the tuning means reaches its high frequency and, through switch means controlled by what is termed the stop-on-signal relay 105—the circuits, switch and relay just referred to being shown diagrammatically in Fig. 1.

When the energizing circuit for the solenoid 80 is completed it effects movement of its plunger 81 to the right and counterclockwise movement of the lever 194, both as viewed in Fig. 2, thereby to tension the spring 70 and to move the cores 72 back to their low frequency positions in the interior of the coils of the tuning means 13, 14 and 15.

The spring 70, which constitutes a power storage means, is the type of power storage means tending to release its power with a quick snap, that is with a constant and rapid acceleration, unless properly restrained. An effective restraining means is provided in the form of a wind vane 74 which is connected to the spring 70 through a gear train which insures that the wind vane is turned a considerable number of revolutions while the spring is contracting from its charged or stretched position to its discharged or contracted position. Thus the necessary restraint can be provided to cause the spring and the tuner, to which it is directly connected, to move from one end of the range to the other at a relatively slow and relatively uniform speed which is determined by the pull of the spring, the aerodynamic resistance of the wind vane and the step-up ratio of the gear train connecting the two. If the gear ratio is increased, the tuner will move more slowly because the torque applied to the wind vane is the pull of the spring divided by the gear ratio. Conversely, a lower gear ratio will cause the wind vane and the tuner to move faster, as with the lower gear ratio, a greater torque is applied to the wind vane.

However, the tuner employed does not vary the frequency of the tuned circuits at a uniform rate throughout its tuning range. A given motion of the tuner changes the frequency by a greater number of kilocycles at the high frequency end than at the low frequency end. It is true that tuners can be made in which the frequency change with motion is uniform throughout the band, but these are not readily obtainable and are costly. It has been found that the desired effect for stop-on-signal tuning can be achieved with the normal commercial type of variable reactance units either of variable permeability, variable capacity, or other type, by varying the gear ratio of the power transmission means between the tuner and the wind vane so that the speed of the tuner is faster where the distance of movement per kilocycle, or the band-spread, is greater, that is at the low frequency end, and slower where the band spread is less, that is at the high frequency end. Some form of compensation to produce uniform variation of frequency per unit time is very desirable with stop-on-signal tuning, because when the stopping signal is given, a certain small interval of time must elapse before the tuner is completely stopped. When the stopping signal occurs approximately at resonance, this time interval causes the tuner to overrun the signal. If the tuning speed is not too high, this overrun is inappreciable. However, it is desirable to run the tuner as fast as possible for quick scanning of the band. If the band spread is unequal throughout the range and the tuning speed is constant, there will be greater overrun where the band spread is smaller. However, if the speed is decreased as the band spread decreases, the tendency to overrun can be kept sufficiently small while the time required to scan the band is short and the average speed high.

I have found that the band can be scanned in the minimum length of time without having the overrun at any portion of the band exceed a certain tolerable amount by running at higher speed at the end of the band where the spread is greatest and at slower speed toward the other end of the band where the spread is less. This can be accomplished by utilizing a variable mechanical advantage or a variable gear ratio in which the ratio changes from one end of the band to the other. At the high frequency end of the band the speed is made low, by making the step-up gear ratio high, while at the low frequency end of the band where the band spread is great and the speed is made high, by making the gear ratio low. This effect results from the fact that with a given force exerted by the spring and a given size of wind vane, the higher gear ratio at the high frequency end applies a smaller torque to the wind vane which causes it to run at a slower speed. At the low frequency end where the gear ratio is lower, the torque applied to the wind vane is larger, which causes it to run at a higher speed. Also as the gear ratio is higher when the wind vane runs slower, there is a greater difference in speed between the wind vane and the tuner at the low speed end which causes the tuner to run slower at the high frequency end because of the changed gear ratio as well as because of the smaller torque applied to the wind vane. The change of gear ratio of course has the opposite effect at the other end of the range so that the change of gear ratio is additive with that of the change of torque throughout the range.

In the embodiment of the invention shown in Figs. 2 and 3, there is an additional factor which may be employed to add still further to the speed change. This is due to the fact that the pull of the spring 70 is somewhat greater when stretched than it is when contracted. As it is stretched to the maximum at the low frequency end of the band where it is desired that the speed should be highest, it will be seen that by selecting a spring in which there is a good deal of change in tension between its stretched and contracted conditions that an added effect of speed change due to the varying spring tension can be obtained.

In the embodiment shown in Figs. 1, 2 and 3 the tuning cores 72 move about three times as fast at the low frequency end of their movement as they do at the high frequency end. This roughly compensates for the fact that with a particular variable permeability tuning core and coil, such as that employed, a given movement of the tuning cores causes a frequency change at the high frequency end substantially three times as great as that caused by the same movement of the tuning cores at the low frequency end. It will be understood that if the band spread variation is different from this the speed variation should be changed to suit the particular band spread variation of the variable reactances employed. Also on account of the higher angular momentum of the moving parts at the higher speed, it may be desirable to have the tuning speed vary somewhat less than the variation of the band spread.

The variable mechanical advantage transmission means includes an arm 202 of the pivoted lever 194, the outer end of which is connected to a sector gear 204 through a variable radius and component driving connection comprising a slot 205 in the gear and a roller 208 carried at the end of arm 202. The gear 204, it may be mentioned, is pivotally mounted upon a stud 207 secured to the chassis 6.

Arm 202 extends substantially at right angles to arm 195. The slot 205 in gear 204 is located to place it approximately parallel with arm 202 when the pivoted lever 194 is in its furthest clockwise position, which position is occupied by it at the end of the tuning movement, i. e., at the high frequency end. In this position the roller 208 is at or near the bottom of the slot that is closest to pivot point 207. Upon counterclockwise rotation of pivoted lever 194 the sector gear 20 turns in the counterclockwise direction until slot 205 assumes the position shown in Fig. 2. A small angular movement of lever 194 when it is in the furthest clockwise position, in which position roller 208 is near the bottom of slot 205 and arm 202 is parallel with the edge of the slot, causes a relatively large angular movement of the sector gear 204.

When the pivoted lever 194 is in the farthest counterclockwise position, illustrated in Fig. 2, the same small angular movement of the lever 194 causes a much smaller change in the angular position of the sector 204. This is because of the change in mechanical advantage between the lever 194 and the sector gear 204. The effective step up gear ratio becomes greater as these elements move from the position corresponding to the lowest frequency to the position corresponding to the highest frequency. This may be regarded as caused by the effective length of the lever pivoted on the sector pivot 207 becoming shorter as the high frequency end is approached while the effective length of the lever pivoted on the lever pivot 201 remains the same. This effect may also be explained, in part, by the fact that in the position shown in Fig. 2, where the axis of the slot 205 is more nearly perpendicular to the axis of arm 202, only a certain component of the motion of arm 202 is effective in moving the gear sector 204 while at the high frequency end of the travel when the arm 202 is substantially parallel to the slot 205, then all of the motion of the arm 202 is effective in moving the sector 204. If desired, a certain modifying effect on the rate of speed change can be secured by making the slot 205 curved instead of straight.

The pivoted lever 194 is also utilized to operate the maintained-contact limit switch 95 at the limits of movement of the tuning means. The switch is operated by a yoke 153 preferably made of insulating material having two extending arms terminating in lugs 92 and 93. The lugs 92 and 93 engage and operate the contacts of a sensitive snap-action limit switch 95 when the tuning means and solenoid reaches either limit of their strokes. The limit switch 95 comprises contact carrying springs 96, 97 and 98, a resilient yoke 99, and a toggle link 100, compressed between yoke 99 and contact spring 97. When the end of the toggle link 100 nearest the yoke is slightly displaced in one direction by either of the lugs 92 and 93 over center with respect to spring 97, then the other end of the toggle link imparts a very rapid snap action displacement to the contact 97 in the opposite direction. It is highly desirable to have a sensitive limit switch so that less power is required to operate it. It may have to be operated by the spring 70 substantially simultaneously with the starting of the apparatus, as when the tuning means has been stopped very near the high frequency limit of travel. If the limit switch cannot be easily operated, then a stronger spring has to be used.

The electrical circuits controlled by the limit switch will now be described briefly. It is adapted, when the relay 105 is in operated position, selectively to energize the solenoid and to render operative the stop-on-signal means to be described hereinafter. Its contact blade 98 is connected to the solenoid winding 82 by conductor 101 and when the stop-on-signal means is effective, i. e., during tuning movement, this circuit is open. The contact spring 96 is connected by conductor 56 and resistor 55 to the cathode circuit of an electron tube 60 included in the stop-on-signal means and this circuit is completed through the limit switch when the tuning means is being operated, the circuit being completed through contact blade 97 in engagement with contact blade 96, conductor 125 and contact 112 of the relay switch, which will be described in greater detail hereinafter.

Returning again to the transmission, it may be noted that the sector gear 204 of the variable mechanical advantage driving means drives the first pinion 85 of a speed amplifying gear train, indicated as a whole by reference character 86. The pinion 85 is attached to and drives a spur gear 128, these two gears being mounted upon a common shaft 129. The spur gear 128, in turn, drives a pinion 130 rotating freely upon a shaft 131.

The speed of the high speed pinion 130 of gear train 86 will vary at a rate depending upon the speed variation of the sector gear 204. The speed of movement of the sector gear 204 varies according to the varying mechanical advantage of the roller 208 acting against slot 205. Accordingly, the speed of pinion 130 and of the shaft 131 is determined not merely by the fixed gear ratio of the gear train, but varies with the position of the mechanical linkage comprising the pivoted lever 194, roller 208, and the slotted sector gear 204. This linkage forms a variable mechanical advantage driving means and its operation is like changing the ratio of the gears and pinions in a gear train. It should be noted that the gear ratio of the driving means is highest and the tuning speed lowest when lever 194 is in its furthest clockwise position, in which position the cores 72 of the tuning inductances 13, 14 and 15 are in their furthest extended position, corresponding to the high frequency end of the tuning scale. The gear ratio is lowest and the tuning speed highest when lever 194 is in its furthest counterclockwise position in which position the cores 72 are fully inserted within the tuning inductances, corresponding to the low frequency end of the tuning scale.

The ends of gear shafts 129 and 131 are journaled through and spacedly supported by mounting plates 136 and 137, as best shown in Figs. 3 and 6. They are vertically supported at their lower end by a thrust leaf 132. The mounting plates are fastened to the chassis 6 in vertically spaced relationship by means of stand-off separators. The mounting plate 137 is vertically offset to accommodate a brake drum 87 and one way driving means 88, an enlarged detail view of which is shown in Fig. 6, and the purpose of which will be described hereinafter.

The brake drum 87 is a small disc of Bakelite or similar substance of fairly light weight and of small diameter to minimize its angular momentum, and possessing good frictional and wearing characteristics. It is pressed upon a reduced diameter shoulder of pinion 130 and rotates freely therewith upon shaft 131.

The wind vane 74 is driven through the one-way driving means 88 in order that it will be effective only during tuning movement of the cores by spring 70 and will not be effective to retard movement of the apparatus when the spring is charged by solenoid 80.

The wind vane is secured to the shaft 131 which extends freely through pinion 130. The shaft has secured to it a bushing 138. A coiled spring type one-way drive 150 surrounds the bushing and resiliently and frictionally engages the bushing. The lower end of the spring is attached to a pin 151 projecting from the brake drum 87, which it may be remembered is secured to the high speed pinion 130. The spring ratchet is coiled in the counterclockwise direction (as viewed from the underside of Fig. 6) around the outside of bushing 138 just tightly enough to seize the bushing firmly and rotate it in the clockwise direction, when brake drum 87 is driven in the clockwise direction under the influence of spring 70. When brake drum 87 rotates counterclockwise, the spring ratchet 150 unwinds enough to slip on bushing 138 so that little rotation of the bushing or of shaft 131 takes place.

The wind vane may be very light and is illustrated as having a light metal hub 103 and four (it can have more) thin fiber vanes 104. However, any equivalent vane type construction may be employed. The wind vane acts as a speed controlling restraining means. An increase in the speed of the wind vane results in an increased aerodynamic resistance to the rotation of the vanes. Thus, for any given torque transmitted to the wind vane by shaft 131, a constant speed is quickly arrived at and maintained.

The speed of the wind vane varies progressively with the change in torque applied to it and which results from the change in gear ratio between the sector gear 204 and the pivoted lever 194. The effect of this changing speed of the wind vane is to vary the speed at which the tuning inductance cores 72 move under the influence of spring 70 so that they move more rapidly in their low frequency fully retracted position than in their high frequency fully extended position. The advantage of this mode of operation will become more apparent later.

The brake, which includes the brake drum 87, is controlled by the stop-on-signal means to terminate variation of the tuning means when a signal or carrier is tuned in. It is controlled by the stop-on-signal relay 105 and the arrangement is such that it is applied when the relay is unlatched and returned to its nonoperated position. In the operated position of the relay, the brake is released so that the tuning means can readily be moved by the spring 70. The brake includes, in addition to the drum 87, a brake shoe 113 which is in effect the shorter portion of the armature 107 of the stop-on-signal relay. When the relay is returned to its nonoperated position, the brake is resiliently applied by a spring 114, one end of which is connected to the brake shoe 113 and the other to a stationary support, as best illustrated in Fig. 2.

The stop-on-signal relay 105 includes a magnetic circuit comprising a ferromagnetic core 106, the armature 107, which is also of ferromagnetic material and mounted for pivotal movement, and a ferromagnetic yoke 108 for completing the flux path from the core 106 to the pivot point of the armature 107.

The relay is provided with three normally open (i. e., when the relay is in nonoperated position) resiliently mounted contacts 110, 111, and 112 and with one normally closed resiliently mounted contact 241. These all cooperate with a contact strip 109 extending from the end of the armature 107 opposite the brake and connected to ground through the armature and a ground lead 117. The spring 114, which urges the brake shoe 113 against the surface of the brake drum 87, serves also to bias the armature toward the open position. It is preferably a relatively strong spring. By the term "open position" is meant the position of the relay in which the magnetic circuit is interrupted because there is an air gap between the armature 107 and the core 106. In this position the brake shoe 113 is applied to the brake drum 87, the contact 241 is closed, and the contacts 110, 111, and 112 are open. The short depending brake enables the spring 114 to exert a powerful pressure with a short motion against the brake drum 87, and the long, oppositely extending portion of the armature permits the contact strip 109 a longer stroke for obtaining the necessary contact clearance.

The receiver is muted during the tuning and recharging operations by contact 111 which is connected to the grid of the first tube of audio amplifier 20 by conductor 126. When the relay 105 is operated and the contact 111 is closed, the grid is grounded through conductor 126, contact strip 109, the relay armature 107 and ground conductor 117. As soon as relay 105 is returned to nonoperated position in response to a signal, contact 111 opens, and once again permits normal audio amplification.

Contact 112 connects contact 97 of limit switch 95 to ground potential via lead 125 when the relay is operated, and disconnects contact 97 from ground potential and prevents operation of the solenoid 80 and tube 60 of the stop-on-signal means, which are selectively controlled by limit switch 95, when the relay is not operated. The reasons for this mode of operation will become apparent subsequently.

Contact 241 connects the automatic gain or volume control circuit 22 to ground, when the relay is not operated, through a time delay condenser 25A which is connected between resistor 23 and contact 241 by lead 242. When the relay is not operated, contact 241 is closed and the time delay condenser 25A, charged through resistor 23, provides normally slow automatic volume control. When the relay is operated, as it is during the tuning operation, contact 241 is open and the condenser is disconnected. The AVC is therefore fast during the tuning operation. This prevents decreased sensitivity because the fast AVC permits the actuating voltage to build up to its full value while the tuning mechanism is traversing the signal. With slow AVC the actuating voltage would not build up to its full value until the originating signal had been passed, resulting in greatly reduced sensitivity when the tuning mechanism moves at moderately high speed.

The flux within the magnetic circuit of the relay 105 is established by means of an operating and holding winding 115 providing sufficient ampere turns and flux to close the magnetic circuit of the relay by attracting the armature 107 into close contact with the core 106 against the pull of spring 114 when the winding 115 is energized by current from the battery 31. When the winding is no longer energized, the flux passing through the magnetic circuit of the relay is not rapidly dissipated. A residual flux remains which is sufficient to maintain the armature 107 in the closed position. To insure this, as well as to permit the use of a stronger spring 114, it is preferred to pass a small current from a bleeder circuit through the closing winding 115 when the relay is operated. This is accomplished by completing the circuit from the positive lead 118 of the winding 115 to ground through a current limiting resistor 119 when the contact 110 is closed. This bleeder circuit permits sufficient current to flow through the holding winding 115 when the relay is closed to maintain a holding flux in the magnetic circuit of the relay sufficient to overcome the pull of spring 114. The relay is thus magnetically latched in operated position by the residual flux and the additional flux resulting from the small bleeder current. If a hardened steel core 106 is employed and the spring 114 is not too strong, this bleeder circuit may be omitted. Bleeder contact 110 may be omitted entirely and the contact end of resistor 119 may be grounded in order to maintain a constant bleeder current if the slight additional current drain is not objectionable.

The relay is manually controlled to initiate the tuning operation by a manually operable contacting bar or push button 120 adapted to connect the operating winding 115 across the battery through a circuit including conductors 118 and 121. Push button 120 is the main tuning control of the receiver which starts the tuner to tune in the next signal. The negative lead 122 of the closing winding 115 runs to the storage battery 31 via the on-off switch 30 as described before. Manual operation of the push button 120 energizes the relay operating winding 115 to operate the relay and the latter remains magnetically latched in its operated position by the holding flux and/or the residual flux maintained within its magnetic circuit.

The leads 123 and 124 from a second winding 116, called a bucking winding, of the stop-on-signal relay are energized under the control of the stop-on-signal means, in this case by current controlled by the electron tube 60, which may be and is shown as a gas tube, which ionizes responsive to conditions of resonance in the tuned circuits of the receiver. When the tube 60 is ionized, current is passed through winding 116 in a direction creating a bucking flux opposing the holding or residual flux in the magnetic circuit of the relay. This neutralizes the holding flux and permits spring 114 to reopen armature 107 and to break the magnetic circuit of the relay. The current producing the bucking flux should not reverse the flux so much as to close the armature after it has once been opened.

The intermediate frequency balanced bridge circuit supplies a restraining voltage to prevent ionization of the gas tube except at or close to the intermediate frequency, thus providing the sharp, precise response desired for exact tuning. The balanced bridge circuit is similar in many respects to the one disclosed and claimed in the application of William J. O'Brien, Serial No. 387,907, filed April 10, 1941, now Patent No. 2,426,580, and will be described only briefly. It comprises a primary circuit and a secondary circuit which are inductively coupled by the mutual inductances 41 and capacity coupled by the capacitor 40. The primary circuit includes the adjustable primary inductance 18, the capacitors 42 and 38, and a resistance phasing or neutralizing arrangement consisting of the adjusting condenser 43 and resistors 44 and 45. The secondary circuit includes an adjustable secondary inductance 39, the adjustment of which is varied by a movable powdered iron core, and a condenser 37. The inductances 18, 19, 39, and 41 and the capacitors 37, 38, 40, 42, and 43 are included in a shielded metal container and form part of what is preferably called a "balanced bridge transformer."

The circuit constants of the primary and secondary circuits are arranged so that they resonate at or near the intermediate frequency. The inductive reactance of the mutual inductances 41 is also adjusted to equal the capacitative reactance of the capacitor 40 at the intermediate frequency. The phasing network comprising the capacitor 43 and the resistors 44 and 45 serves to balance out the resistive coupling which exists between the primary and secondary circuits so that the total coupling between the primary and secondary circuits may approach zero at the intermediate frequency. This results in a response curve with two negative voltage peaks, one on either side of the resonance center and a very steep depression therebetween going down to or nearly to zero voltage. The resonance of the secondary circuit with capacitor 37 tuned by inductance 39 causes these two peaks to be higher in voltage.

The restraining voltage derived from the balanced bridge circuit is rectified by the diode plate 46A of an electron tube 46 which may be a 6SQ7G or 6Q7 type. The diode plate is coupled to the circuit by capacitor 37A. The rectified negative restraining voltage appears across resistor 67 and is applied to grid 47. A biasing battery 69 maintains a sufficient negative bias through resistor 68 upon the grid 47 to keep the plate current low when no signal is applied to the grid 47. The plate 49 of tube 46 is connected to a point between the plate of the radio frequency amplifier 11 and the resistor 26. Variations in plate current of the radio frequency amplifier 11 will therefore create a variable voltage drop across the resistor 26 which is applied to the plate of tube 46 and which serves as the actuating voltage for operating the gas tube 60. A signal tuned in will produce a large increase in voltage across the voltage divider 21 and a correspondingly large negative voltage upon the automatic volume control lead 22. This causes the plate current of the radio frequency amplifier 11 to decrease, resulting in a smaller voltage drop across resistor 26. This places a higher positive potential upon the plate 49 of tube 46, which would result in a larger plate current through the tube. However, the actual plate current through tube 46 is restrained by the effect of the restraining voltage from the balanced bridge circuit on the grid 47 so that although the plate voltage response curve due to the action of the automatic volume control is quite broad, the two high negative peaks and the sharp depression between them in the negative restraining voltage response curve provide a very steep sided narrow positive signal to the gas tube grid 61, as shown more fully in said copending application of William J. O'Brien.

In order that the normal time delay of the AVC may not delay the actuating voltage from reaching its peak before the signal to be tuned in passes the narrow valley of the restraining voltage, contact 241 disconnects the AVC time delay condenser 25 from the AVC circuit 22 during the tuning operation, while relay 105 is closed.

The plate-cathode circuit of the tube 46 is completed to ground through the negative terminal of battery 31 through the cathode lead 66 and a resistor 51. The positive voltage developed across this resistor when normal plate current is flowing in tube 46 is substantially equal to the negative voltage supplied from battery 31, so that cathode 48 is close to ground potential with normal plate current. The positive voltage drop developed across resistor 51 increases when a signal is tuned in and is applied to the grid 61 of tube 60 which may be of the 2051 or 2050 type.

A small time delay network consisting of resistor 53 and capacitor 54 connected to ground may be inserted in the grid lead 52 in order to prevent extremely short pulses or other disturbances from prematurely ionizing the gas tube.

The cathode 62 and shield grid 63 of the gas tube 60 are connected to ground through a variable resistor 55 and the limit switch 95 and relay operated switch 109, 112. A bleeder resistor 28 associated with resistor 55 forms a potentiometer to provide the desired negative grid bias relative to the cathode and to constitute a sensitivity control, although other types of sensitivity control may be used. The limit switch opens the cathode circuit of tube 60 when solenoid 80 is energized and thus insures that the gas tube cannot ionize and apply the brake shoe 113 to brake drum 87 in response to a signal while solenoid 80 is retensioning spring 70.

The cathode to ground connection from contact 97 is also interrupted by contact 112 when the stop-on-signal relay opens. The cathode side of the gas tube plate circuit is therefore disconnected at all times except during the short interval after the relay is operated by operating push button 120 and before it is released by the bucking winding 116 to stop on a signal. This method of operation is stable, economical, and dependable. The gas tube is energized only during the brief interval within which tuning is accomplished, and no provision for maintaining stable ionization for long periods of time is required as in some gas tube devices. This method of operation is also economical, because the plate circuit of the gas tube is opened and the flow of plate current stopped while a station is being listened to.

The plate 64 is connected directly to one terminal of the bucking winding 116 of the relay 105 by lead 123. The other terminal of the bucking winding 116 is connected by means of lead 124 to a capacitor 65 connected to the cathode, and adapted to be charged from the "B" supply through a current limiting resistor 59. The size of capacitor 65 and of resistor 59 may be chosen such that when the plate circuit is closed, the voltage required to ionize the gas tube does not build up across the capacitor 65 immediately, but only after an interval of time sufficiently long to permit the spring 70 to move the tuning inductance cores 72 enough to detune the receiver from the last station received. This feature of my invention may be employed to avoid a second stoppage of the receiver upon the same station or stoppage too close thereto which might occur especially if the selectivity is low. It also provides a means by which the tuner may be made to travel a predetermined distance before stopping to tune in the next station. The capacitor 65 also has another function, namely, to give a large surge of current through the bucking coil although requiring only a limited charging current.

The length of the time delay is determined by the capacitance of the capacitor and the resistance of the resistor, the time delay increasing with an increase of the values of capacitance and resistance. In this connection the sharpness of the stop-on-signal or balanced bridge selective circuit should be considered. If the stop-on-carrier signal is sharp, then less time delay is required to insure that there will be no second stoppage on the same signal.

The operation of the embodiment of the invention described above proceeds as follows: Referring to Fig. 1, assume the solenoid 80 to have just completed retensioning the spring 70, at which point the tuning inductance cores 72 are completely retracted within the coils of inductance tuning means 13, 14, and 15, as illustrated. Lug 92 of the limit switch 95 has closed contacts 96 and 97 to close the gas tube cathode circuit and has opened contacts 97 and 98 to deenergize the solenoid 80. Assume relay 105 to be in the open position. In this position, contacts 110, 111, and 112 are open, contact 241 is closed, and the depending brake shoe portion 113 of armature 107 is held against the brake drum 87 by spring 114.

When it is desired to tune in a station, push button switch 120 is closed and the following takes place. Button 120 closes the circuit energizing the stop-on-signal relay operating winding 115 and creates a magnetic flux within the core 106 of the relay, which flux links the armature 107 and attracts it to the core to close the magnetic circuit of the relay. This closes contacts 110, 111, and 112, opens contact 241, and retracts brake shoe 113 from contact with brake drum 87. Closing the magnetic circuit creates a residual flux therein which is sufficient normally to maintain the armature in the closed position against the pull of spring 114 even after winding 115 is deenergized when button 120 is released. When contact 110 is closed, the bleeder circuit through current limiting resistor 119 energizes the winding 115 and maintains the relay magnetically latched in the closed position. Closing contact 111 grounds the grid of the first tube of audio amplifier 20 and "mutes" the receiver during the tuning operation. Closing contact 112 completes the ground return circuit from the gas tube cathode 62 through limit switch contacts 96 and 97 and conditions the gas tube and associated means for stop-on-signal operation. Contact 241 opens and disconnects the time delay condenser 25A from the grounded side of the AVC circuit and provides fast AVC during the tuning operation as before described.

When the relay is closed by means of push button 120 and brake shoe 113 is retracted from brake drum 87, the tension of spring 70 acting upon yoke 71 pulls the tuning inductance cores 72 out of the inductances, which immediately detunes the receiver from the last signal to which it had been tuned and disturbs the condition of resonance with that signal which had existed in the receiver circuits and in the stop-on-signal circuit. This lowers the automatic volume control voltage, which causes the plate current of the radio frequency amplifier to increase and to create a relatively large voltage drop across resistor 26. The increased voltage drop across resister 26 lowers the potential at the plate end of the resistor and therefore the potential applied to tube 46 via lead 25. A substantial decrease does not take place until the receiver is considerably detuned from exact resonance with a signal. The balanced bridge circuit, however, imposes a negative restraining voltage upon the grid of tube 46 when the receiver has been detuned as little as one kilocycle from exact resonance. This negative voltage on the grid restrains the plate current through the tube and lowers the grid potential applied to the tube 60 to a value prohibiting ionization thereof.

The motion of the tuning inductance cores under the influence of the driving spring 70 continues as long as no other station is encountered. The pivoted roller 75 of yoke 71 cams the arm 195 and causes the pivoted lever 194 to turn clockwise around the pivot 201. The arm 202 moving in clockwise direction cams the side of the slot 205 of sector gear 204 by means of roller 208, causing the sector gear to turn in clockwise direction. The teeth of the sector gear engage and drive the pinion 85 of the speed amplifying gear train 86 which drives pinion 139 and the brake drum 87 at a high rate of speed in the clockwise direction, as viewed in Fig. 2. The spring ratchet 150 clamps bushing 138 when turning in this direction and causes shaft 131 and wind vane 74 to rotate at the same rate of speed. This rate of speed is determined by the aerodynamic resistance encountered by the blades 184 of the wind vane, by the force of spring 70, by the total mechanical advantage of the speed amplifying means, and by friction. It is desirable that the tuning speed be restrained by the aerodynamic resistance of the wind vane and to the smallest extent by friction. This may be facilitated by the use of a large wind vane revolving at slow speed, which is characteristic of the wind vane 74 of Figs. 1, 2, and 3. A slower speed gear train has less friction than a higher speed gear train, and a larger fan, although revolving at lower speed, provides the required restraining effect. The low friction provides easy starting and therefore requires less spring tension. This enables the spring to be recharged with a smaller current flow through the recharging solenoid.

The aerodynamic resistance to rotation of the wind vane varies approximately as the square of the speed of rotation of the wind vane, so that a steady speed of rotation corresponding to the torque applied to the vane tends to be maintained. Inasmuch as the variable gear ratio changes from a high ratio at the high frequency end of core travel, the torque applied to the wind vane varies from high torque at the low frequency end to a low torque at the high frequency end. The speed of the wind vane, and of the tuning inductance cores, therefore, is greater at the low frequency end than it is at the high frequency end.

In the present embodiment of the invention, the compensation results not only from the conjoint and additive action of the variable gear ratio and the variable torque applied to the wind vane but also from the arrangement of the spring, which is under the greatest tension and therefore exerts most force when the fastest movement of the tuning means is desired, i. e., at the low frequency end of movement.

The wind vane 74 has been described as being of light construction, comprising thin fiber blades and a light metal spindle, and this is important unless the one way drive works freely. It may be desirable to deviate from this construction by increasing the mass of the blades, for instance by loading the tips of the blades so as to increase the inertia of the wind vane to accelerate more slowly initially thereby diminishing any tendency to skip closely adjacent stations. With a good ratchet this can be done without this added momentum causing more overrun because the ratchet permits the brake drum to stop while the wind vane is still turning. If no ratchet is used the wind vane should be made as light as possible. Although a closely adjacent signal will be tuned into more slowly, the normal tuning speed, determined by the wind vane dimension, is soon attained and the entire tuning range may be covered in almost the same time as with the unloaded vane.

When another station or signal is encountered, resonance occurs in the tuned circuits of the receiver. The negative voltage of the automatic volume control lead 22 rises and decreased plate current flows through the radio frequency amplifier, which results in increasing the positive potential of the connection 25 and the plate of tube 46. The relatively broad action of the automatic volume control results in increased plate voltage at some distance from the point of exact resonance. However, not until a point within about one kilocycle or less of exact resonance is reached does the balanced bridge circuit reduce the negative bias upon the grid 47 of tube 46 to a value that permits increased current to flow in the plate circuit thereof. When current is permitted to flow in the plate circuit of tube 46, it produces a positive voltage across resistor 51 which is applied to the grid 61 of the gas tube 60 and which causes it to ionize.

The condenser 65 was charged by the "B" supply through the resistor 59 when the relay contact 112 was closed as a result of operation of the push button 120. Ionization of the gas tube now produces a sudden surge-like discharge of the condenser 65 through the bucking winding 116, which neutralizes or bucks out the holding flux through the magnetic circuit of the relay, causing armature 107 to be pulled into and held in its non-operated position by spring 114. The tension of spring 114 also holds the depending brake shoe portion 113 of the armature against brake drum 87, effecting quick stopping, although the wind vane can stop more slowly because of the one-way drive to it. Further movement of the tuning means is thus checked immediately and the receiver consequently remains tuned to to the signal which initiated operation of the stop-on-signal circuit. When the relay opens, it closes contact 241 which connects the time delay condenser 25A to the AVC lead 22, and reestablishes the normally slow AVC which is desired during listening.

The point of attachment of spring 70 to the tuning means, or rather to the yoke 71 which moves the tuning inductance cores, enables the spring to bias all movable abutting connections between the tuning means and the brake into positive contact with each other when the relay spring 114 applies the brake, i. e., all the play is taken out of the drive. No detuning as a result of lost motion can therefore occur. Inasmuch as the spring ratchet 150 is not interposed between the tuning means and the brake, but follows the brake, impositive operation of the ratchet will not result in detuning.

The opening of relay 105 by the sudden surge of current through the bucking coil 116 is effected so quickly that brake 113 is applied to brake drum 87 before any substantial detuning of the receiver due to further movement of the tuning inductance cores 72 can occur. This is aided by the use of a powerful spring 114, of a small clearance between the brake 113 and the brake drum 87, and of a quick acting trigger device and relay. However, it is desirable to use a speed amplifying gear train to drive the brake drum 87 at a relatively high rate of speed compared to the motion of the tuner. This permits a large linear displacement of the braking surface for even a relatively small movement of the tuning inductance cores, which in the embodiment described is about 26 to 1. The small amount of slippage that occurs during the braking action is therefore accompanied by a movement of the tuning inductance cores $1/26$ as great, which is negligible. Small mass and momentum of the faster moving parts is desirable for quick stopping.

The gas tube does not remain ionized after response to a signal because the plate circuit lead 56 to ground is immediately broken by the opening of contact 112 when the relay opens. This insures that no voltage changes or oscillations can reionize the gas tube and prematurely retune the set. It also reduces "B" current drain during listening.

If another station is desired to be tuned in, the above described operations are initiated and caused to be repeated by pressing push-button 120. Push-button 120 need be depressed only momentarily to select another station. If it is desired to traverse the entire tuning range of the receiver, however, or to skip a substantial portion thereof, the push button may be depressed longer and when it is released, the next signal encountered will stop the tuning device. If the push button is held depressed indefinitely, the spring 70 will cause the tuning inductance cores 72 to traverse their entire tuning range (which is accomplished in about four seconds) until pivoted lever 194 is in its furthest clockwise position and lug 93 meets and trips the switch 95, energizing solenoid 80, which retensions spring 70. This also occurs if the push button 120 is not held down but the tuning inductance cores 72 reach the limit of their travel without encountering a signal.

When the limit switch is tripped to recharge spring 70, it breaks the gas tube circuit through contacts 96 and 97 and prevents possible application of the brake shoe 113 while solenoid 80 is energized. Solenoid 80 retensions the spring 70 by pulling arm 195 of the pivoted lever 194 downward to its furthest counter-clockwise position. When spring 70 has been completely retensioned and pivoted lever 194 has reached its furthest counter-clockwise position, lug 92 trips the limit switch and closes contacts 96 and 97 and opens contacts 97 and 98. This deenergizes solenoid 80 and reconnects relay contact 112 to the gas tube circuit through contacts 96 and 97.

When the solenoid 80 turns the pivoted lever 194 in the counter-clockwise direction to retention spring 70, the pinion 130 and shaft 131 turn in the counter-clockwise direction. In this direction the spring ratchet 150 releases its hold upon bushing 138 and wind vane 74 does not check the speed with which spring 70 is retensioned. Being free of the restraint of the wind vane, spring 70 is retensioned in a small fraction of the time that is required to traverse the tuning range of the receiver subject to the restraint of the wind vane 74.

Figure 5:
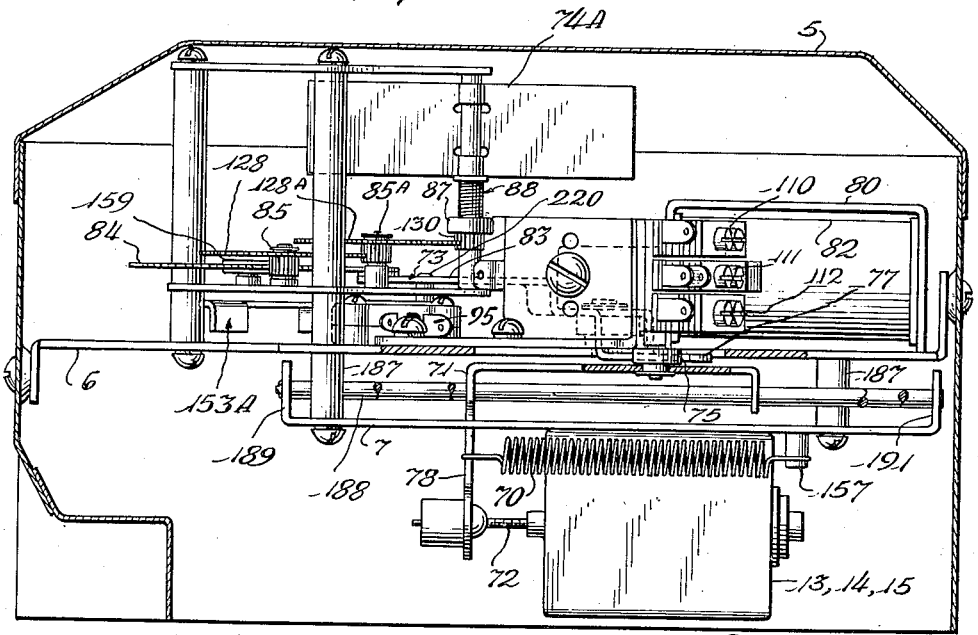
Fig. 5 is a detailed view in elevation of the apparatus shown in Fig. 4 as seen along the lines 5—5.

The embodiment of the invention illustrated in Figs. 4 and 5 differs from the preferred embodiment illustrated in Figs. 2 and 3 primarily in the means employed for realizing the variable gear ratio. Instead of the slotted sector gear 204 cammed by a roller 208 upon the end of arm 202 of pivoted lever 194 as shown in Fig. 2, a rack 84 pivotally attached at one end to the arm 83 of the pivoted lever 73 is employed. The lever 73 is mounted in the chassis 6 for pivotal movement about pivot 76 (see Fig. 4) and it has a camming arm 77 engageable by the roller 75 of the core supporting the moving yoke 71. A short, oppositely extending portion 78 of arm 77 is provided with a slot 199 cooperating with a pin 198 attached to the end of solenoid plunger 81. When solenoid 80 is energized, the pivoted lever 73 is moved clockwise and cams the roller 75 toward the left to retension spring 70. The movable end of spring 70 in this embodiment is hooked directly to the yoke 71 near the point to which are fastened the inductance core shafts and the stationary end of the spring is fastened to a lug 157 on subchassis 7 so that the spring moves the cores into, instead of out of, the coils of the tuning devices.

Rack 84 engages the first pinion 85 of the speed amplifying gear train 86 and is held in engagement therewith by means of a roller 159. The relationship of the pivot point 76 and of pinion 85 of the gear train are chosen such that when the pivoted lever 73 is in its furthest counter-clockwise position, in which position the tuning inductance cores 72 are completely inserted and the solenoid plunger 81 is fully withdrawn, the arm 83 and rack 84 assume a position close to dead center, i. e., they approach alignment, as illustrated in Fig. 4 in solid lines. In this position, a large movement of the tuning inductance cores 72 results in relatively few turns of the gear train 86. When the solenoid 80 has fully retracted its plunger 81 and fully retracted the inductance cores 72 and retensioned spring 70, the relative position of the rack 84 and arm 83 is as shown in the changed position view shown in phantom in Fig. 4. In this position, a relatively small movement of the tuning inductance cores results in a much larger movement of the gear train.

The pinion 85 drives the wind vane 74A, which is of lighter construction and driven at a faster speed than vane 74, and brake member 87 through the speed amplifying gear means which includes the spur gear 128 mounted on the same shaft as pinion 85, an intermediate pinion 85A and spur gear 128A, the latter of which meshes with the high speed pinion 130. The limit switch 95 of this embodiment is operated in slightly different manner by a pivotally mounted yoke 153A actuated by arm 83 of the lever 73 through a pin and slot connection 220, 222. A diagrammatic showing of this embodiment is included in the contemporaneously filed application of Edward F. Andrews, Serial No. 707,219.

The operation of this embodiment of the invention is similar to the operation of the preferred embodiment except primarily for the specifically different method of obtaining the variable gear ratio to effect band spread compensation. From the changed position shown in phantom in Fig. 4 it is apparent that the wind vane 74A, as in the preferred embodiment, is driven by a low torque at the highest gear ratio when the tuning inductance cores are fully withdrawn to their high frequency position. When the cores are in their low frequency position as shown in Fig. 5 and by the position in solid lines in Fig. 4, the pivoted rack 84 is in almost the dead center position with respect to arm 83 of the pivoted lever 73, so that a high torque is applied to the wind vane which, together with the tuning inductance cores 72, moves faster here where the band spread is greater. The change in tuner speed from one end of the band to the other is somewhat less in this embodiment than the one of Figs. 2 and 3 previously described. The gear ratio is also higher so that for one unit of motion of the tuning cores 72 the periphery of the brake drum moves substantially 87 units. The wind vane runs faster here and therefore can be smaller and still a slower speed and a greater time (about 6 seconds) in scanning the band is provided.

Certain features of the present invention may be used with other types of radio receivers, such, for example, as those supplied with power from an alternating current source. Also, tubes other than the gas type may be used. For example, a vacuum tube may be used in the place of a gas tube in the interest of economy. The vacuum tube can be arranged to operate the relay upon a change in the plate current of the tube from a low value to a higher value upon the application of a stopping signal of sufficient strength thereto. The different plate currents result from a change in the conductivity of the tube from a lower to a higher value, as contrasted with the operation of a gas tube which changes from a nonconductive to a conductive condition. An embodiment of the invention employing an alternating current source of power and a vacuum tube is illustrated in Fig. 7 to which reference will now be had. Only part of a complete apparatus has been illustrated in this figure as, except for the portion illustrated, the apparatus may be like that illustrated in Fig. 1.

The power source is an alternating current line and may be the usual 110 volt lines to which the primary winding 302 of a transformer 304 is connected. Plate voltage is supplied to the tubes by a rectifier including a tube 306 energized from a secondary winding 310 of the transformer and which may be of conventional construction. A filter indicated generally by the reference character 312 may be connected to the output of the rectifier, also in conventional manner. Plate voltage for the various tubes is supplied from the output of the filter as through a conductor 314. Low voltage alternating current for the filaments of the various tubes is applied by another secondary winding 316.

The stop-on-signal means includes the "balanced bridge transformer" described hereinabove and the control signal is supplied to a stop-on-signal relay tube 318 through the conductor 66 and the time delay elements including the resistor 53 and capacitor 54. The stop-on-signal voltage appears across the resistor 51 which is connected across conductor 66 and the negative line 320 of the rectifier.

The tube 318 is a high vacuum tube and is preferably a pentode of the high plate transconductance type, such as a 6SH7 or 6AK5 tube. It includes a cathode 322, a control grid 324, and a plate 326, to which the screen grid 328 is permanently connected in order to provide an increased charge in plate current for a given charge in grid voltage.

The stop-on-signal control voltage is supplied to the grid 324, as already indicated. The grid is also connected to a point somewhat negative with respect to ground in order to bring the cathode of tube 66 substantially to zero voltage when no signal is applied to its grid. The connection is to the negative side of a resistor 330 interposed between the ground connection 332 and the power supply conductor 320. A resistor 334 is connected between ground and the plate voltage supply.

The stop-on-signal relay 105, is shown as including the operating coil 115 and the bucking coil 116, as well as the armature 107. In Fig. 7 the apparatus is shown in listening position. In this position the automatic time delay capacitor 25A is connected to ground through the armature 107 and ground conductor 117. The mute circuit 111, 126 is open as is the circuit 112, 125 to the center contact 127 of the limit switch 95.

The bucking coil 116 is connected across the cathode-anode circuit of the tube 318 by conductors 336, 338, the capacitor 340 and conductor 342 in such manner that when the tube is rendered more conductive, as it is rather suddenly in response to the application of the positive stop-on-signal control voltage to its grid, the capacitor 340, which has been previously charged, discharges through the tube and the bucking coil, thereby to effect quick release of the relay 105 so that its armature 107 will return to its nonoperated position.

The capacitor 340 is adapted to be charged from the plate voltage supply through a conductor 343 and the current limiting and time delay providing resistor 344, which limits the charging current to capacitor 340 so that when the tuning operation is initiated, the apparatus will not stop at the same station but will travel a sufficient distance so as to tune in the next station. The tube 318 is normally biased so that it is only slightly conductive by the adjustable bias resistor 346 and a bleeder resistor 348 connecting it to the positive side of the plate voltage supply. The cathode is connected to the junction of these two resistors by the conductor 342 while the other end of the adjustable resistor 346 is connected by the conductor 56 to contact 96 of the limit switch 95.

The operating coil 115 is adapted to be energized from the plate voltage supply when the normally open push button switch 120 is depressed to complete an energizing circuit for the operating coil. The energizing circuit extends from the positive terminal of the plate voltage supply through conductor 342, conductor 350, current limiting resistor 352, the operating coil, conductor 354, the push button switch 120 and ground conductor 356. If desired, a bleeder resistor 358 may be connected across the contacts of the starting switch for the purpose of providing a small current flow through the operating coil, thereby additionally and magnetically to latch the stop-on-signal relay in its operated position.

In this embodiment of the invention, alternating current is used as a source of power for the spring charging solenoid 80 and in order to simplify the control and more particularly to enable the control of both the alternating and direct current circuits by the same switching mechanisms, the alternating current for the solenoid 80 is supplied by another transformer secondary winding 360. One terminal of the transformer is grounded by conductor 362 and the other terminal leads to the solenoid winding 82. The other terminal of the winding is connected by conductor 101 to the contact blade 98 of the limit switch.

It is believed that the operation of the embodiment of the invention described above will be apparent from the preceding description. However, in brief review, to place the apparatus in operation to tune in a signal the push button switch 120 is depressed thereby to energize the operating coil 115 of the stop-on-signal relay by connecting it across the plate voltage supply. The relay armature 107 is thereupon moved to release the tuning means brake and to complete the mute circuit and the circuit extending through the limit switch placing the stop-on-signal means in operative position, i. e., by completing the cathode circuit of the tube 318.

When a signal is tuned in, a relatively sudden and sharp signal is applied to the grid 324 of the relay control tube 318. As previously described, this signal renders the grid of the tube more positive thereby to make the tube more conductive. When the tube becomes more conductive the capacitor 340 is discharged through it and through the bucking coil 116 of the stop-on-signal relay, with the result that the latter is immediately returned to its nonoperated position by the spring 114. The brake is reapplied, the mute removed and the time delay capacitor 25A reinserted in circuit for normal audio reception.

To tune in another station the push button switch 120 is again depressed to initiate the tuning operation. If the button is kept depressed or no signal is tuned in by the time the tuning means has reached the limit of its movement toward the high frequency end, the limit switch 95 is operated as previously described to complete an energizing circuit for the spring recharging solenoid winding 82.

In the present embodiment of the invention the solenoid winding 82 is connected across the secondary winding 360 of transformer 304, the circuit extending through the conductor 101, limit switch contact blade 98, 97, conductor 125, armature 107 and the ground conductor 117. It will be noticed that under these conditions the armature 107 and movable contact 97 of the limit switch are in both alternating and direct current circuits. The arrangement is also such that there is no danger of short circuiting the alternating current voltage supply, which would be a real danger if the solenoid were not supplied with power from a secondary winding but were supplied from the 110 volt line. In the latter case care would have to be exercised in plugging in the radio set to prevent short circuiting the 110 volt line through radio set ground connection.

It should be understood that the embodiments of the invention which have been described in detail above are intended to exemplify and not to limit the invention, except in so far as set forth in the accompanying claims.

Having thus described my invention, what I claim as new and desire to secure by Letters Patent is:

1. Stop-on-signal radio apparatus having movable nonlinear band spread tuning means, power means tending to accelerate said tuning means beyond a desired low speed for moving said tuning means; and means including variable mechanical advantage transmission means driven by said power means, and movement restraining means driven by said transmission means, for varying and retarding the speed of movement of said tuning means to retard the speed of tuning to a greater extent where the band spread is least and to retard the speed of tuning to a substantially lesser extent where the band spread is greater.

2. In a stop-on-signal radio apparatus, movable tuning means, chargeable spring means exerting a greater force with a greater charge for moving said tuning means, means for stopping the movement of said tuning means by said spring means in response to a signal, means for charging said spring means, speed retarding means, the speed of which decreases as the applied torque decreases, and transmission means including variable mechanical advantage means driven by said spring means, driving said retarding means and operatively connected to said tuning means to control the speed of said tuning means so that its speed decreases as it is moved by said spring means, said spring means and variable mechanical advantage means being so connected to said tuning means and retarding means that the tuning means is moved at a decreasing speed by said spring means as a result of decrease in torque applied to the retarding means, an increase in the gear ratio of said variable mechanical advantage means, and a decrease in the spring tension.

3. In stop-on-signal radio apparatus, movable tuning means having a variable band spread, power storage means for moving said tuning means, and a variable ratio mechanical linkage including speed varying and movement restraining means operatively associated with said tuning means and power storage means for varying the speed of said tuning means in a manner to compensate for the variation in the band spread of said tuning means.

4. In stop-on-signal radio apparatus, movable tuning means having a variable band spread, power storage means for moving said tuning means, and means including speed varying and movement restraining means associated with said tuning means and power storage means for decreasing the speed of said tuning means as the band spread decreases.

5. In stop-on-signal radio apparatus, movable tuning means having a variable band spread, power storage means including a spring for moving said tuning means, means including speed varying and movement restraining means operatively associated with said tuning means and power storage means for regulating the speed of said tuning means, and means for terminating the variation of said tuning means by said power storage means in response to a signal, said spring varying in tension and being so associated with said tuning means as to vary the speed of said tuning means to compensate for the variation in the band spread of said tuning means.

6. Stop-on-signal radio apparatus having movable tuning means, speed retarding means resisting movement of said tuning means, signal responsive stopping means for stopping said tuning means, step-up transmission means having lost motion driving said retarding means and stopping means from said tuning means, and resilient power storage means driving said tuning means and taking up the play in the transmission means between the retarding means and the tuning means while in motion and between the stopping means and the tuning means when stopped by the stopping means in response to a signal.

7. In stop-on-signal radio apparatus, variable tuning means, means for varying said tuning means, means including a circuit comprising electron tube means adapted to operate automatically in response to the tuning in of a signal for terminating variation of said tuning means, means for changing the condition of said circuit to place said variation terminating means in operative condition, a capacitor-impedance time delay means connected to said circuit for preventing operation of said variation terminating means for a time interval following the changing of the condition of said circuit.

8. Stop-on-signal radio apparatus having variable tuning means, power storage means for varying said tuning means, signal responsive means for stopping said tuning means, electromagnetic means for charging said power storage means, means including a transformer having one secondary winding providing a source of direct current power, a second secondary winding of said transformer providing a source of alternating current power, and switch means operable alternately to connect said electromagnetic means to said alternating current source and said signal responsive stopping means to said direct current source.

9. In a stop-on-signal radio apparatus, variable tuning means, resilient power storage means for varying said tuning means, a direct current power circuit, means for stopping said tuning means in response to a signal energized by direct current from said power circuit, an alternating current power circuit, electromagnetic means for charging said resilient power storage means energized by alternating current from said power circuit, means including a single-pole, double-throw switch operatively associated with said tuning means for preventing operation of said electromagnetic means during the time that the variation of said tuning means is stopped by said stopping means and for preventing operation of said stopping means during the operation of said electromagnetic means, the movable pole of said switch being connected to both the direct current and alternating current circuits.

10. In a stop-on-signal radio apparatus, variable tuning means, resilient power storage means for varying said tuning means, means for terminating the variation of said tuning means by said power storage means in response to a signal, means for charging said resilient power storage means, and means for preventing operation of said charging means during the time that the variation of said tuning means is stopped by said terminating means, and for preventing operation of said stopping means during operation of said charging means, said last mentioned means including a single pole, double-throw switch operatively associated with said tuning means.

11. In a stop-on-signal radio apparatus, variable tuning means, power storage means for varying said variable tuning means, means for terminating variation of said tuning means in response to a signal including signal responsive relay means and single pole, double-throw switch means operated thereby, means for charging said power storage means, and means for preventing operation of said charging means during the time that the variation of said tuning means is interrupted by said variation terminating means and for preventing operation of said stopping means during operation of said charging means including a single-pole, double-throw limit switch operatively associated with said tuning means, the movable pole of which is connected to a contact of said relay operated switch means.

12. In a stop-on-signal radio apparatus, variable tuning means, power storage means for varying said variable tuning means, means for terminating variation of said tuning means in response to a signal including signal responsive relay means and single pole, double-throw switch means operated thereby, a circuit associated with said radio apparatus, electromagnetic means for charging said power storage means, and means for preventing operation of said charging means during the time that the variation of said tuning means is interrupted by said terminating means and for preventing operation of said stopping means during operation of said charging means including a single-pole, double-throw limit switch operatively associated with said tuning means, the movable pole of which is connected to a contact of said relay operated switch means, the movable pole of said relay switch means being connected to a point common to the circuit of said electromagnetic means, said signal responsive stopping means, and said associated circuit.

13. In stop-on-signal radio apparatus, variable tuning means, power storage means for varying said tuning means, electromagnetic means for storing power in said power storage means, stop-on-signal means including a relay operated switch for terminating variation of said tuning means by said power storage means in response to a signal, and limit switch means including a limit switch member movable into different positions to render operative said stop-on-signal means or said electromagnetic means, said relay operated switch having a contact connected to said movable limit switch member and a grounded movable switch member.

14. Stop-on-signal radio apparatus having movable tuning means, power means for moving said tuning means, movement retarding means, and means operatively connecting said retarding means to said tuning means including a pair of members movable angularly about different axes and a pin and slot type driving connection between said members.

15. Stop-on-signal radio apparatus having movable tuning means, power means for moving said tuning means, movement retarding means, and means operatively connecting said retarding means to said tuning means including an angularly movable member, and a driving connection between said members having angular and radial components of movement relative to said angularly movable member.

16. In stop-on-signal radio apparatus, movable tuning means having a variable band spread, power storage means including a variable tension spring associated with said tuning means, the tension of said spring decreasing as the band spread decreases and the band spread increasing as the spring tension increases, means including movement restraining means operatively associated with said tuning means and power storage means for regulating the speed of said tuning means, and means for terminating the variation of said tuning means by said power storage means in response to a signal tuned in by said tuning means.

17. Stop-on-signal radio apparatus having movable tuning means, speed retarding means resisting movement of said tuning means, signal responsive stopping means for stopping said tuning means, drive means having lost motion driving said retarding means and stopping means from said tuning means, and yielding power storage means driving said tuning means and taking up the play in the drive means between the retarding means and the tuning means while in motion and between the stopping means and the tuning means when stopped by the stopping means in response to a signal.

18. In stop-on-signal radio apparatus, variable tuning means, means for varying said tuning means, stop-on-signal means operable automatically in response to the tuning in of a signal by said variable tuning means for terminating variation of said tuning means, manual starting means associated with said last-mentioned means for placing it in starting condition, and capacitor-impedance time delay means associated with said stop-on-signal means for preventing operation thereof for a time interval following the operation of said starting means.

19. Stop-on-signal radio apparatus having variable tuning means, power storage means for varying said tuning means, means responsive to a signal tuned in by said tuning means for stopping said tuning means, electromagnetic means for charging said power storage means, a direct current power circuit, an alternating current power circuit, and switch means operable alternately to connect said electromagnetic means to said alternating current circuit and said signal responsive stopping means to said direct current circuit.

OLGIERD GIERWIATOWSKI.

REFERENCES CITED

The following references are of record in the file of this patent:

UNITED STATES PATENTS

| Number | Name | Date |
| --- | --- | --- |
| 1,855,152 | Jones | Apr. 19, 1932 |
| 1,968,302 | Maurer | July 31, 1934 |
| 2,084,851 | Leishman | June 22, 1937 |
| 2,205,097 | Knos et al. | June 18, 1940 |
| 2,292,063 | Dome | Aug. 4, 1942 |
| 2,299,084 | Elliott | Oct. 20, 1942 |
| 2,304,871 | Andrews | Dec. 15, 1942 |
| 2,305,123 | Williams | Dec. 15, 1942 |
| 2,369,542 | Dietrich | Feb. 13, 1945 |